United States Patent [19]

Instance

[11] Patent Number: 4,726,972

[45] Date of Patent: Feb. 23, 1988

[54] LABEL

[76] Inventor: David J. Instance, Guinea Hall, Sellindge, Kent, United Kingdom

[21] Appl. No.: 895,951

[22] Filed: Aug. 13, 1986

[30] Foreign Application Priority Data

Aug. 14, 1985 [GB] United Kingdom ................. 8520418

[51] Int. Cl.$^{4}$ ............................ B32B 7/06; B32B 7/12

[52] U.S. Cl. ....................................... 428/40; 428/124; 428/130; 428/138; 40/2 R; 40/306; 40/310; 283/81; 283/101; 283/105

[58] Field of Search ................. 428/40, 124, 130, 138, 428/194; 40/2 R, 306, 310; 281/14; 283/81, 101, 105

[56] References Cited

U.S. PATENT DOCUMENTS

| | | | |
|---|---|---|---|
| 2,506,015 | 5/1950 | Doepke | 229/73 |
| 3,718,277 | 2/1983 | Volkert | 281/18 |
| 4,592,572 | 6/1986 | Instance | 40/306 |

*Primary Examiner*—Alexander S. Thomas
*Attorney, Agent, or Firm*—Birch, Stewart, Kolasch & Birch

[57] ABSTRACT

A label for attachment to a container, the label comprising a folded longitudinal strip which is divided into a row of panels by a plurality of transverse fold lines, two of the panels forming a front cover and a back cover for the remaining panels of the strip when folded, the back cover being adhered by its rear surface to a support web and all of the panels other than the front cover panel being provided with at least one hole whereby when the strip is folded each hole is adjacent a respective corresponding hole in an adjacent panel so as to form at least one composite hole through the panels other than the front cover panel which reveals at least one exposed portion of the support web, the or each exposed portion being coated with an adhesive whereby the front cover panel can be folded over the remaining panels and adhered by its inner surface to the or each exposed portion thereby to retain the strip in its folded condition.

12 Claims, 3 Drawing Figures

LABEL

BACKGROUND OF THE INVENTION

The present invention relates to a label for attachment to a container such as a bottle, packet or tin and in particular to a self-adhesive label which can be carried on a length of release backing material.

SUMMARY OF THE INVENTION

It is an object of the present invention to provide a so-called "extended text" label which can be unfolded to reveal previously hidden surfaces.

The present invention provides a label for attachment to a container, the label comprising a folded longitudinal strip which is divided into a row of panels by a plurality of transverse fold lines, two of the panels forming a front cover and a back cover for the remaining panels of the strip when folded, the back cover being adhered by its rear surface to a support web and all of the panels other than the front cover panel being provided with at least one hole whereby when the strip is folded each hole is adjacent a respective corresponding hole in an adjacent panel so as to form at least one composite hole through the panels other than the front cover panel which reveals at least one exposed portion of the support web, the or each exposed portion being coated with adhesive whereby the front cover panel can be folded over the remaining panels and adhered by its inner surface to the or each exposed portion thereby to retain the strip in its folded condition.

DESCRIPTION OF THE PREFERRED EMBODIMENTS

Figure 1:
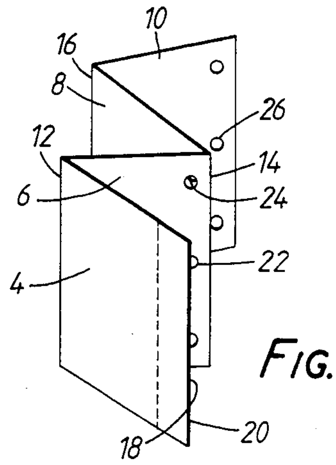
FIG. 1 shows a longitudinal strip for use in a label according to the invention.

Referring to FIG. 1 of the drawings, a longitudinal strip 2 e.g. of paper is folded into a series of panels 4, 6, 8, 10 by a plurality of transverse fold lines 12, 14, 16. The strip 2 is folded in concertina fashion about the fold lines 12, 14, 16. One end panel 4, which constitutes a front cover for the remaining panels, is provided on its inner surface with a band 18 of a material which renders the paper hydrophobic. The band 18 is parallel to and is disposed along the free end edge 20 of the front cover panel 4. The remaining panels 6, 8, 10 each have a respective of holes 22, 24, 26 parallel to and spaced from a respective end edge thereof. The rows of holes 22, 24, 26 are formed in the longitudinal strip 2 such that when the strip 2 is folded in concertina-like fashion the rows of holes 22, 24, 26 are aligned in registry with each other to form a single composite row of holes through the remaining panels 6, 8, 10 of the strip 2.

Figure 2:
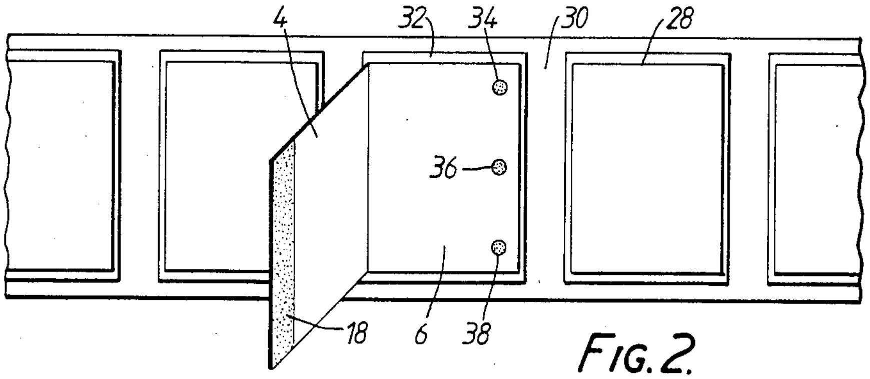
FIG. 2 shows a succession of labels in accordance with a first embodiment of the invention when carried on a length of release backing material.

FIG. 2 shows a number of labels 28 in accordance with a first embodiment of the invention when carried in succession on a length of release backing material 30. The central label 28 is shown opened and the remaining labels 28 are shown closed. The labels 30 are opened in the manner which is described hereunder.

As is shown in FIG. 2, the rear surface of the end panel 10, which is at the other end of the strip 2 from the front cover panel 4, is adhered to a support web 32 e.g. of paper, constituting a label base portion, which is coated on its reverse side with a layer of pressure sensitive adhesive which is covered with the release backing material 30. Each label 28 can be peeled off from the release backing material 30 and can then be attached to a container to be labelled by the layer of pressure sensitive adhesive.

The panel 10 is adhered to the support web 32 by a layer of adhesive which is applied initially to the support web 32 by an appropriate adhesive applicator. This adhesive is a water soluble adhesive such as a pVA (polyvinyl alcohol) adhesive. The rows of holes 22, 24, 26 in the remaining panels 6, 8, 10 expose three adhesive layer portions 34, 36, 38 on the support web 32. The front cover panel 4 is folded over so as to cover the remaining panels 6, 8, 10 so that the band 18 covers each of the adhesive layer portions 34, 36, 38 and is adhered to the support web 32 by those adhesive layer portions 34, 36, 38 thereby to retain the longitudinal strip 2 in its folded condition.

The band 18 and the adhesive used to form the adhesive layer portions 34, 36, 38 are chosen such that the adhesive adheres more strongly to the support web 32 than to the band 18 whereby to open the label the band 18 can be separated from the adhesive layer portions 34, 36, 38 without tearing the front cover panel 4 and can be readhered to those portions 34, 36, 38 when it is desired to re-close the label. This results in a resealable label.

Preferably, the water-borne pressure sensitive adhesive is an acrylic copolymer pressure sensitive adhesive, such as that sold by National Adhesives, of Slough, Berkshire, United Kingdom under the trade name Nacor 360.

Preferably, the material which renders the paper of the label hydrophobic consists of a mixture of a polysiloxane, such as those manufactured under the code name WS70M and WS78L by Wacker and sold in Great Britain by Ambersil Limited, Basingstoke, Hants, United Kingdom as Silicone Fluid F100, and an overprinting varnish, such as that made by Fishburn and having the code name XF 05546. Preferably, the mixture contains from 90 to 99.5 vol. % polysiloxane and from 0.5 to 10 vol % varnish.

The resultant label 28 can be opened and closed a number of times by detaching and reattaching the front cover panel 4 from and to the adhesive layer portions 34, 36, 38 on the support web 32.

The surface of the panels 4, 6, 8, 10 of the longitudinal strip are printed with information relating to the product in the container which is to be labelled. In its closed condition, the panels 6, 8, 10 other than the front cover panel 4 are concealed from view. When the label is opened, those other panels 6, 8, 10 are revealed and can be read by a user.

Figure 3:
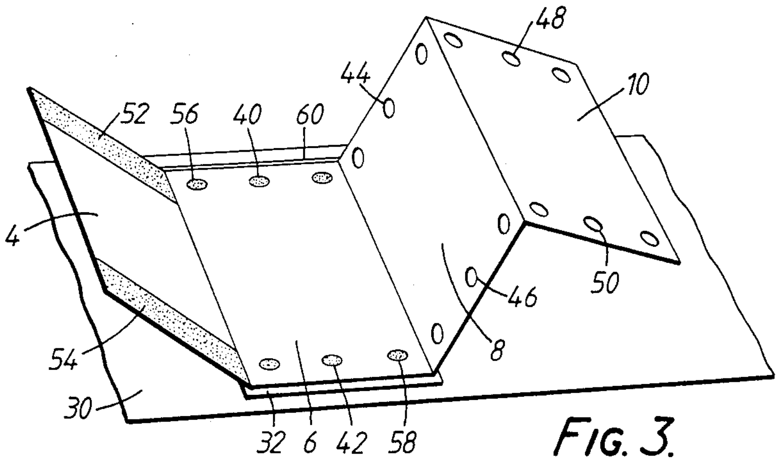
FIG. 3 shows a label in accordance with a second embodiment of the invention when carried on a length of release backing material.

A second embodiment of a label in accordance with the invention is shown in FIG. 3. In this embodiment, the longitudinal strip 2 again has a row of four panels 4, 6, 8, 10 divided by the transverse fold lines 12, 14, 16. Each panel 6, 8, 10 of the longitudinal strip 2 other than the front cover panel 4 is provided with two opposed rows of holes 40, 42; 44, 46; 48, 50. Each row of holes is positioned parallel to and spaced slightly from a respective one of the longitudinal edges of the longitudinal strip 2. The inner surface of the front cover panel 4 is provided with two opposed bands 52, 54 of material which renders the paper hydrophobic which are positioned along the two longitudinal edges of the front cover panel 4. The panel 6 which is adjacent to the front cover panel 4 is adhered by a layer of adhesive to the support web 32 and constitutes a back cover for the remaining panels 6, 8, 10. The two rows of holes 40, 42 in the adjacent panel 6 each expose a respective row of adhesive layer portions 56, 58. The remaining two panels 8, 10 are then folded over the back cover panel 6 whereby the rows of holes in the three panels 6, 8, 10 other than the front cover panel 4 are aligned in registry so as to form two composite rows of holes. The front cover panel 4 is then folded over the panels 6, 8, 10 whereby each band 52, 54 is adhered to the support web 32 by a respective row of adhesive layer portions 56, 58 which is exposed by a respective composite row of holes.

As for the label of FIGS. 1 and 2, the label 60 of FIG. 3 may be opened and closed as desired by detaching the front cover panel 4 from adhesive layer portions 56, 58 on the support web 32 and then unfolding the end panels 8, 10 and then by refolding the panels and reattaching the front cover panel to the support web 32.

In a modification of the labels of FIGS. 1 and 2 and FIG. 3, the label 28 is not resealable and is not provided with the band 18 or bands 52, 54 on the inside of the front cover panel 4. Instead, the paper of the front cover panel 4 is adhered directly to the adhesive layer portions 34, 36, 38 or 56, 58. The front cover panel 4 is opened by pulling the inside surface of the front cover panel 4 away from the exposed adhesive layer portions on the support web 32. In this modification, the adhesive used for the layer of adhesive may be the same as that used in the embodiments of FIGS. 1 and 2 and FIG. 3, namely a water-borne adhesive.

The labels of the present invention may be made by either of the methods which are disclosed in British Patent Specification No. 2127378 published on 11th Apr. 1984 in the name of David J. Instance.

In those methods, a length of pressure-sensitive stock, consisting of a support web of self-adhesive paper which is carried on a backing of release material 30 is passed, in turn, through a die-cutting station at which a succession of label base portions 32 are cut in the support web and through an adhesive applying station at which a succession of layers of adhesive are applied to the succession of label base portions 32. The part of the support web which is outside the label base portions is removed as a waste web remnant either before or after the adhesive applying station. The succession of label base portions 32 on the release backing material 30 then passes through a label applying station at which a succession of the folded longitudinal strips 2, having the band or bands and the rows of holes already formed, are applied to the succession of label base portions 32 so that each folded longitudinal strip 2 is adhered to a respective label base portion 32 by a respective layer of adhesive. The resultant labels 28, 60 on the release backing material 30 are wound up onto a reel from which they may subsequently be removed for application to containers.

What I claim is:

1. A label for attachment to a container, the label comprising:

a folded longitudinal strip which is divided into a row of panels by a plurality of transverse fold lines, two of the panels formiing a front cover and a back cover for the remaining panels of the stip when folded; and a support web, said back cover being adhered by its rear surface to said support web and all of the panels other than the front cover panel being provided with at least one hole whereby when the strip is folded each hole is adjacent a respective corresponding hole in an adjacent panel so as to form at least one composite hole through the panels other than the front cover panel which reveals at least one exposed portion of the support web, said at least one exposed portion being coated with adhesive whereby the front cover panel can be folded over the remaining panels and adhered by its inner surface to said at least one exposed portion thereby to retain the stip in its folded condition.

2. A label according to claim 1, wherein at least that part of the inner surface of the front cover panel which is adhered as aforesaid is coated with a material which releasably adheres to the adhesive on said at least one exposed portion whereby the front cover panel can be selectively detached from and reattached to said at least one exposed portion to open and close the strip.

3. A label according to claim 2, wherein the folded strip is made of paper, the adhesive is a water-soluble adhesive, and the material which releasably adheres to the adhesive contains polysiloxane.

4. A label according to claim 1, wherein the front cover panel and back cover panel are opposed end panels of the strip and the at least one composite hole is provided adjacent a transverse edge of the folded strip.

5. A label according to claim 4, wherein the at least one composite hole comprises a row of three composite holes.

6. A label according to claim 1, wherein the front cover panel is an end panel of the strip, the back cover panel is adjacent the front cover panel, and the at least one composite hole comprises at least two composite holes, each of which is provided adjacent a respective longitudinal edge of the folded strip.

7. A label according to claim 6, wherein each of the at least two composite holes comprises a row of three composite holes.

8. A reel of release backing material carrying a succession of self-adhesive labels, each said self-adhesive label comprising:

a folded longitudinal strip which is divided into a row of panels by a plurality of transverse fold lines, two of the panels forming a front cover and a back cover for the remaining panels of the strip when folded; and a support web, said back cover being adhered by its rear surface to said support web and all of the panels other than the front cover panel being provided with at least one hole whereby when the strip is folded each hole is adjacent a respective corresponding hole in an adjacent panel so as to form at least one composite hole through the panels other than the front cover panel which reveals at least one exposed portion of the support web, said at least one exposed portion being coated with adhesive whereby the front cover panel can be folded over the remaining panels and adhered by its inner surface to said at least one exposed portion thereby to retain the strip in its folded condition.

9. A succession of labels carried on a length of release backing material, each said label comprising:

a label base portion releasably adhered to said length of release backing material;

a folded longitudinal strip divided into a plurality of panels, one of said panels formiing a front cover panel and another of said panels forming a back cover panel, said back cover panel being adhered by adhesive to said label base portion, wherein at least one hole is provided through said back cover and through any other panel, other than said front cover panel, folded over said back cover panels forming at least one composite hole through said panels for closing the label by adhering said front cover panel through said composite hole to said label base portion by said adhesive.

10. The succession of labels according to claim 9, wherein said front cover panel of each label is provided with a band of hydrophobic material on an inside surface portion of said front cover panel aligned with said composite hole for producing a resealable label.

11. The succession of labels according to claim 10, wherein said hydrophobic material comprises a mixture of polylsiloxane.

12. The succession of labels according to claim 9, wherein said folded strip of each label comprises four panels and said strip being folded in concertina-like fashion with said front cover panel separated from said back cover panel by the remaining two panels.

* * * * *